(12) United States Patent
Faith

(10) Patent No.: US 7,073,249 B1
(45) Date of Patent: Jul. 11, 2006

(54) METHOD FOR PROVIDING A WORM ON AN ARMATURE SHAFT OF AN ELECTRIC MOTOR, AND ARMATURE PRODUCED BY THE METHOD

(75) Inventor: Lothar Fauth, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 624 days.

(21) Appl. No.: 09/719,469

(22) PCT Filed: Mar. 3, 2000

(86) PCT No.: PCT/DE00/00685

§ 371 (c)(1),
(2), (4) Date: Apr. 18, 2001

(87) PCT Pub. No.: WO00/64032

PCT Pub. Date: Oct. 26, 2000

(30) Foreign Application Priority Data

Apr. 15, 1999 (DE) ................. 199 16 998

(51) Int. Cl.
*H02K 7/116* (2006.01)
*H02K 15/00* (2006.01)

(52) U.S. Cl. .............. 29/598; 29/893.3; 29/893.31; 29/893.35; 310/83

(58) Field of Classification Search .............. 310/83, 310/75 R; 29/596, 598, 893, 893.31–893.37, 29/597, 732, 733, 90.1; 74/425, 458; 72/102, 72/104, 108
See application file for complete search history.

(56) References Cited

U.S. PATENT DOCUMENTS

| 3,303,366 | A | * | 2/1967 | Elson et al. .................. 310/83 |
| 3,866,486 | A | * | 2/1975 | Lechner ...................... 74/425 |
| 4,589,299 | A | * | 5/1986 | Kobayashi et al. ........... 74/458 |
| 4,885,948 | A | * | 12/1989 | Trasher, Jr. et al. ....... 74/89.14 |
| 4,987,791 | A | * | 1/1991 | Nakahashi et al. ........... 74/425 |
| 5,056,213 | A | * | 10/1991 | Behnke et al. ................ 29/596 |
| 5,213,000 | A | * | 5/1993 | Saya et al. ................... 74/425 |
| 5,408,897 | A | * | 4/1995 | Klinar ........................ 74/425 |
| 6,664,684 | B1 | * | 12/2003 | Kobschaetzky .............. 310/90 |
| 6,810,576 | B1 | * | 11/2004 | Karl ........................... 29/596 |
| 2003/0159533 | A1 | * | 8/2003 | Fauth ......................... 74/425 |
| 2004/0010914 | A1 | * | 1/2004 | Saysette-Rasmussen et al. ....................... 29/893.35 |
| 2005/0138980 | A1 | * | 6/2005 | Kidowaki ..................... 72/88 |

FOREIGN PATENT DOCUMENTS

| DE | 4125491 | | 2/1993 |
| EP | 712 197 | * | 5/1996 |
| FR | 2 565 043 | * | 11/1985 |
| WO | 98/10971 | * | 3/1998 |
| WO | 00/64032 | * | 10/2000 |

* cited by examiner

Primary Examiner—Karl Tamai

(57) ABSTRACT

The invention relates to a method for mounting a worm on an armature shaft of an armature for an electric motor. The invention proposes first mounting armature parts, such as an armature lamination packet with armature windings, a commutator, a bearing seat, and/or a bearing, on the armature shaft and then rolling the worm on the armature shaft. This has the advantage that the worm can have a greater diameter than does the armature shaft over its remaining length.

6 Claims, 2 Drawing Sheets

METHOD FOR PROVIDING A WORM ON AN ARMATURE SHAFT OF AN ELECTRIC MOTOR, AND ARMATURE PRODUCED BY THE METHOD

CROSS-REFERENCE TO RELATED APPLICATIONS

This application is a 35 USC 371 application of PCT/DE00/00685 filed on Mar. 3, 2000.

BACKGROUND OF THE INVENTION

Field of the Invention

The invention relates to a method for mounting a worm on an armature shaft of an armature of an electric motor, and to an armature produced by the method.

It is known to produce a worm by reshaping, in particular by rolling an armature shaft of an electric motor in one piece with the armature shaft. Next, the armature is assembled from its individual parts; that is, for instance an armature lamination packet, a commutator and a bearing are placed on the armature shaft. The armature lamination packet can already be provided with armature windings when it is placed on the armature shaft, or the armature windings can be wound onto the armature lamination packet after it is placed on the armature shaft. To enable placing the individual parts of the armature onto the armature shaft, an outer diameter of the worm produced by reshaping on the armature shaft must not be any greater than a diameter of the armature shaft over the remaining length of the armature shaft. This has the disadvantage that an armature shaft of large diameter is necessary, or the worm must have a small diameter, and this limits a load-bearing force and thread pitch of the worm.

Another possibility is to produce the worm as a separate part, place it on the armature shaft, and connect it to the armature shaft in a manner fixed against relative rotation. This has the disadvantage of greater effort and expense, and there can be misalignment between the armature shaft and the worm.

OBJECTS AND ADVANTAGES OF THE INVENTION

In the method according to the invention first the armature is assembled from its individual parts; that is, the armature lamination packet, commutator and sliding and/or roller bearings are for instance placed in the armature shaft, and next the worm is produced by reshaping of the armature shaft. In this way, it is possible to produce the worm with a larger diameter than the remaining armature shaft, since the individual parts of the armature do not have to be placed on the armature shaft past the worm. For the reshaping, the armature shaft can be received at its bearings or bearing points. The invention has the advantage that a simple, economical armature shaft without graduations can be used; that is, the armature shaft can be produced from a bar with no change in cross section whatever over its entire length, for instance economical rod material. The invention also makes a small diameter of the armature shaft possible, thus reducing both the structural size and weight of the armature and thus the structural size and weight of the entire electric motor. Because of the reduced weight and the reduced diameter of the armature, its moment of rotational inertia is reduced, thus improving the starting performance of the electric motor. Because of its greater core diameter, the worm produced according to the invention has greater strength. Because of the integral production of the worm with the armature shaft, any misalignment is slight.

According to one aspect of the invention, the worm is preferably produced by rolling.

According to another aspect of the invention, before the worm is produced, a tubular bearing seat can be mounted between armature parts placed on the armature shaft, that is, for instance, the armature lamination packet and the commutator, and the worm that is yet to be produced. The tubular bearing seat can for instance be press-fitted or shrunk onto the armature shaft, the latter meaning that the bearing seat is heated and thereby increased in diameter and is consequently slipped smoothly onto the armature shaft, on which, after cooling down, it is seated nondisplaceably and in a manner fixed against relative rotation. As a result of the bearing seat, it is possible to increase the diameter of the armature shaft in the region of the bearing to at least the outer diameter of the worm, without having to use a graduated armature shaft for the purpose. The greater diameter at the bearing seat of the armature shaft makes it possible to mount a shaft bearing, after the worm has been produced by reshaping. This has the advantage that a coolant lubricant used in shaping the worm, or dirt particles produced in shaping the worm, do not get into the shaft bearing, and that the armature, after the shaping of the worm, can be cleaned without problems, for instance even with a rinsing solution.

According to another aspect of the invention, the bearing, disposed between the armature lamination packet and the commutator on the one hand and the worm on the other, can be placed directly on the armature shaft, without any separate bearing seat and before the shaping of the worm. This has the advantage of dispensing with a separate bearing seat and its assembly, and has the advantage that all the parts to be placed on the armature shaft are placed on the armature shaft before the shaping of the worm. The production of the armature ends with the shaping of the worm, and the bearing does not have to be placed on the shaft later as well.

BRIEF DESCRIPTION OF THE DRAWINGS

The invention is described below in further detail in terms of two exemplary embodiments shown in the drawing.

DESCRIPTION OF THE PREFERRED EMBODIMENTS

Figure 1:
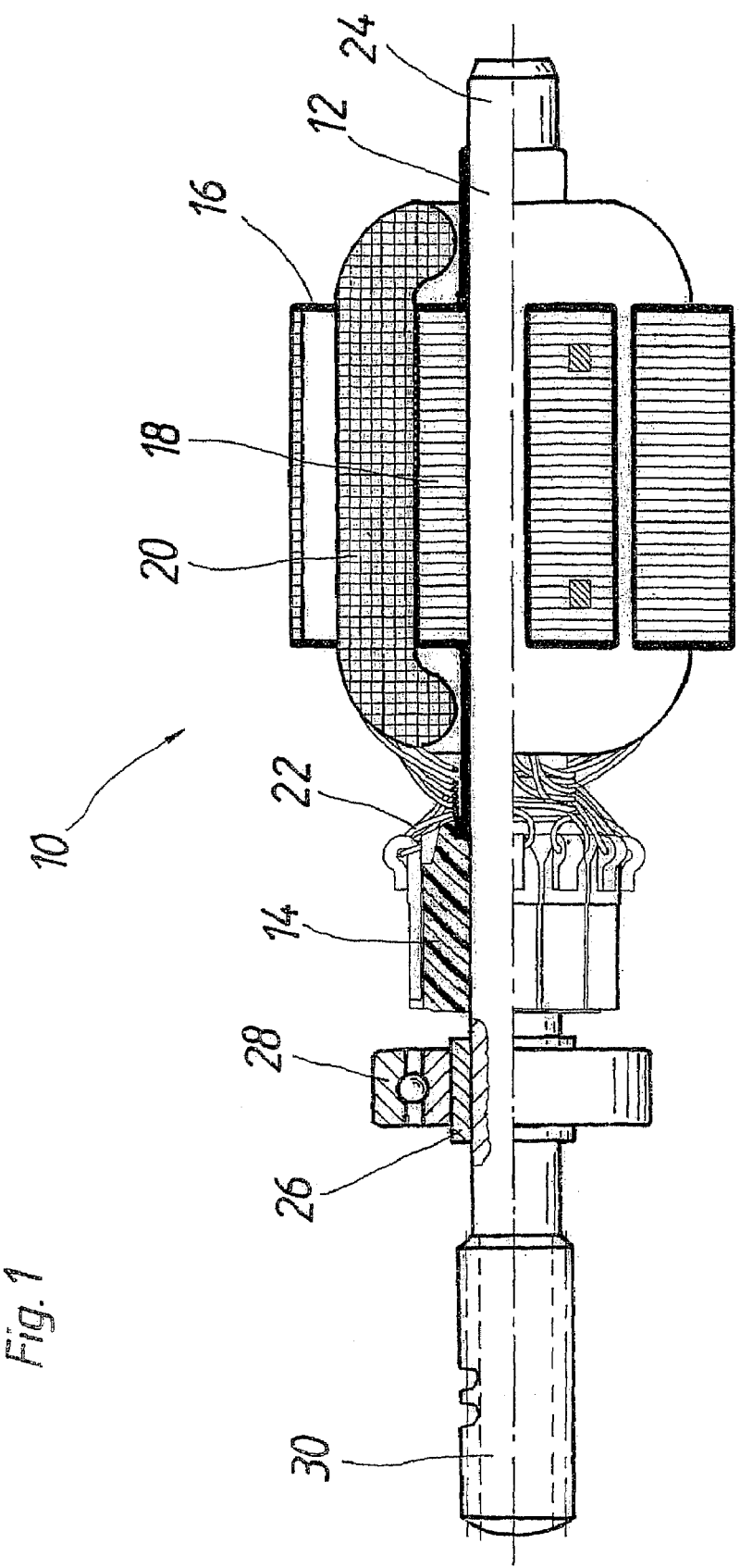
FIGS. 1 and 2 each show an armature produced according to the invention, in half section.

The armature 10 shown in FIG. 1 and produced according to the invention has an armature shaft 12, which is made from a cylindrical material that has no changes in diameter or cross section over its length. For instance, the armature shaft 12 can be cut from cylindrical rod material. According to the invention, individual parts of the armature 10, which in the exemplary embodiment shown are a commutator 14 and an armature lamination packet 18 spray-coated with plastic 16, are placed in a manner fixed against relative rotation on the armature shaft 12. The armature lamination packet 18 has armature windings 20, which are wound onto the armature lamination packet 18 either before or after the armature lamination packet 18 is placed on the armature shaft 12. Ends 22 of the armature windings 20 are contacted at the commutator 14 in a manner known per se.

On the side of the armature lamination packet 18 remote from the commutator 14, the armature shaft 12 protrudes a short way out of the armature lamination packet 18 and the armature windings 20. This end of the armature shaft 12 forms a bearing seat 24 for a slide bearing, not shown. On the other side, the armature shaft 12 protrudes by a greater distance from the commutator 14. On this side, a tubular bearing seat 26 for a roller bearing 28 or a slide bearing, not shown, is pressed or shrunk onto the armature shaft 12 axially nondisplaceably and in a manner fixed against relative rotation. After the mounting of the commutator 14, the armature lamination packet 18 with the armature windings 20, and the bearing seat 26 on the armature shaft 12, the end of the armature shaft protruding from the bearing seat 26 is shaped by rolling into a worm 30. In the rolling of the worm 30, the armature 10 can be supported on both of its bearing seats 24, 26. The worm 30 has a greater outer diameter than the armature shaft 12 over its remaining length outside the worm 30. Because of the shaping of the worm 30 after the mounting of the armature lamination packet 18 with the armature windings 20 and the commutator 14 on the armature shaft 12, the worm 30 can be produced with a greater diameter than the armature shaft 12 over its remaining length, since the aforementioned parts 18, 20, 14 of the armature 10 do not have to be slipped over the worm 30.

The bearing seat 26, placed on the armature shaft 12 between the commutator 14 and the worm 30, has at least as large an outer diameter as the worm 30, so that the ball bearing 28, or a slide bearing, not shown, can be placed on the bearing seat 26 after the rolling of the worm 30 and any optional cleaning of the armature.

Figure 2:
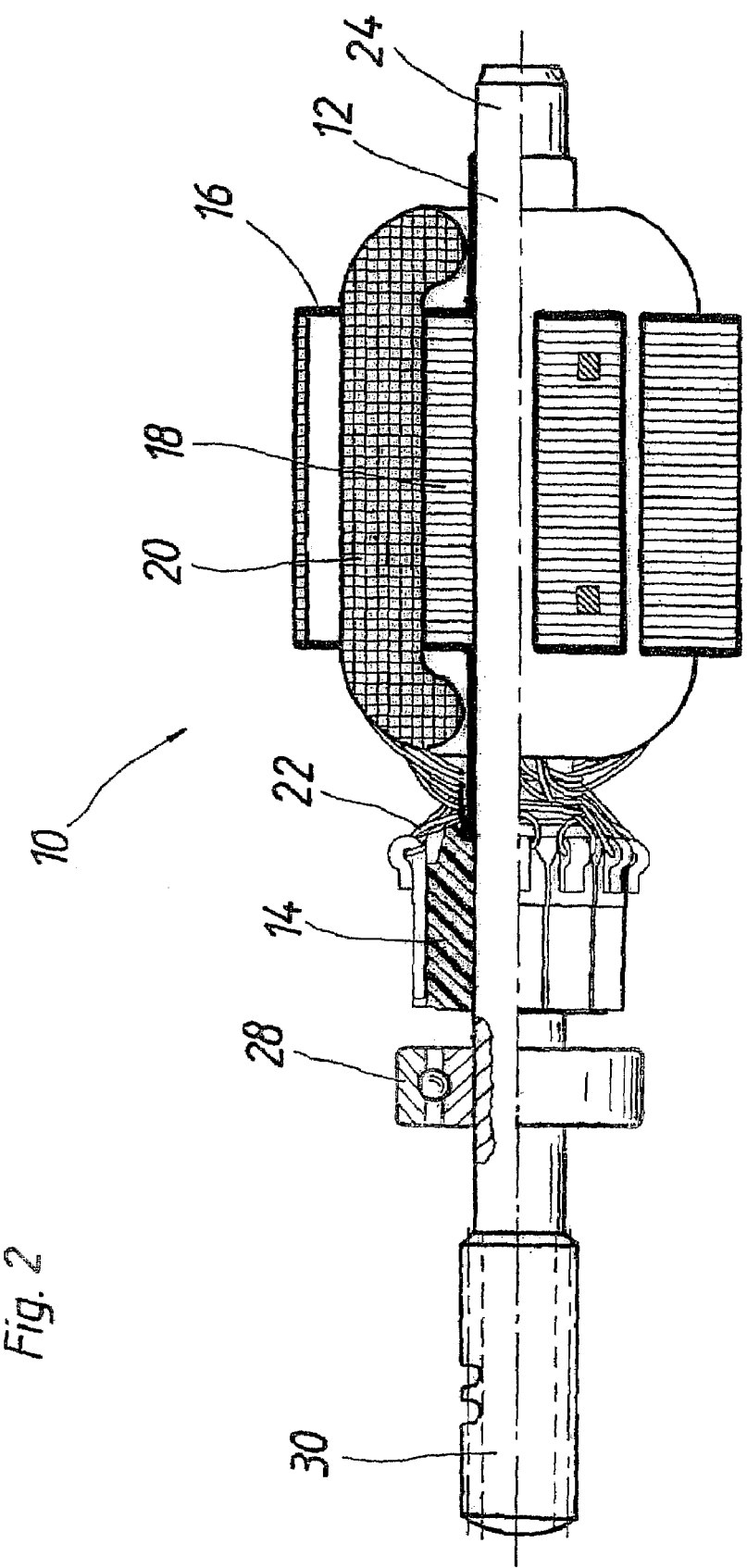

In the case of the armature shown in FIG. 2, the bearing seat 26 disposed between the commutator 14 and the worm 30 is omitted; the ball bearing 28, or the slide bearing not shown, is placed on the armature shaft 12 directly and before the rolling of the worm 30. The ball bearing 28, or the slide bearing not shown, can be used for supporting the armature 10 during the rolling of the worm 30. The ball or slide bearing 28 is covered if necessary for the rolling of the worm 30.

The foregoing relates to preferred exemplary embodiments of the invention, it being understood that other variants and embodiments thereof are possible within the spirit and scope of the invention, the latter being defined by the appended claims.

The invention claimed is:

1. A method for producing an armature shaft of an electric motor having a worm, wherein the worm (30) is produced by reshaping the armature shaft (12) after the armature assembly is mounted on the armature shaft.

2. The method of claim 1, wherein that the worm (30) is produced by rolling.

3. The armature shaft produced by the method of claim 1, wherein the worm (30) has a greater outer diameter than does the armature shaft (12) over its remaining length and wherein a tubular bearing seat (26), whose outer diameter is at least as great as an outer diameter of the worm (30), is mounted on the armature shaft (12) between the worm (30) and other parts (14, 18, 20) of the armature (10) that are placed on the armature shaft (12).

4. The armature shaft produced by the method of claim 1, wherein the worm (30) has a greater outer diameter than does the armature shaft (12) over its remaining length and wherein a shaft bearing (28) is mounted directly on the armature shaft (12), between the worm (30) and other parts (14, 18, 20) of the armature (10) that are placed on the armature shaft (12).

5. A method for producing an armature shaft of an electric motor having a worm, wherein the worm (30) is produced, at the end of the armature assembly (10), by reshaping the armature shaft (12), wherein that before the production of the worm (30), a tubular bearing seat (26) is mounted on the armature shaft (12) between other parts (14, 18, 20) of the armature (10), which are placed on the armature shaft (12), and the worm (30) to be produced, and an outer diameter of the bearing seat (26) is at least as great as an outer diameter of the worm (30) to be produced.

6. A method for producing an armature shaft of an electric motor having a worm, wherein the worm (30) is produced, at the end of the armature assembly (10), by reshaping the armature shaft (12), wherein that before the worm (30) is produced, a shaft bearing (28) is mounted on the armature shaft (12) between other parts (14, 18, 20) of the armature (10), which are placed on the armature shaft (12), and the worm (30) to be produced.

\* \* \* \* \*